United States Patent

Yokota et al.

[11] Patent Number: 6,041,883
[45] Date of Patent: Mar. 28, 2000

[54] FLOW CONTROLLING APPARATUS FOR POWER STEERING SYSTEMS

[75] Inventors: Tadaharu Yokota; Tatsuyoshi Maruyama; Norihiro Saita; Toshinori Aihara, all of Kanagawa, Japan

[73] Assignee: Unisia Jecs Corporation, Atsugi, Japan

[21] Appl. No.: 08/814,488

[22] Filed: Mar. 10, 1997

[30] Foreign Application Priority Data

Mar. 14, 1996 [JP] Japan .................................. 8-084538

[51] Int. Cl.$^7$ ..................................................... B62D 5/07
[52] U.S. Cl. .......................................... 180/422; 180/441
[58] Field of Search ................................... 180/417, 421, 180/422, 423, 441; 137/116.3; 91/437

[56] References Cited

U.S. PATENT DOCUMENTS

| | | | |
|---|---|---|---|
| 3,744,515 | 7/1973 | Inoue ...................................... | 180/441 |
| 4,135,436 | 1/1979 | Duffy ........................................ | 138/45 |
| 4,342,279 | 8/1982 | Seko et al. ................................. | 116/31 |
| 4,982,803 | 1/1991 | Kervagoret ............................... | 180/441 |
| 5,098,259 | 3/1992 | Ohtaki et al. ............................ | 417/308 |
| 5,112,199 | 5/1992 | Otaki et al. .............................. | 417/310 |
| 5,121,807 | 6/1992 | Adams ...................................... | 180/441 |
| 5,152,359 | 10/1992 | Emori et al. ............................. | 180/441 |
| 5,284,220 | 2/1994 | Shimizu et al. .......................... | 180/422 |
| 5,353,004 | 10/1994 | Takemoto et al. ........................ | 338/50 |
| 5,471,838 | 12/1995 | Suzuki et al. ............................ | 60/468 |
| 5,474,145 | 12/1995 | Haga et al. ............................... | 180/132 |
| 5,577,573 | 11/1996 | Haga et al. ............................... | 180/417 |

FOREIGN PATENT DOCUMENTS

| | | |
|---|---|---|
| 0 752 361 | 1/1997 | European Pat. Off. . |
| 7-81593 | 3/1995 | Japan . |
| 2 238 279 | 5/1991 | United Kingdom . |

*Primary Examiner*—Kevin Hurley
*Attorney, Agent, or Firm*—Foley & Lardner

[57] ABSTRACT

A power steering system includes a fluid pump, a steering gear, a high-pressure passage connecting the fluid pump to the steering gear, and a flow control valve having a first chamber forming a part of the high-pressure passage. A metering orifice is disposed in the high-pressure passage between the first chamber and the steering gear. A feedback passage distributes feedback pressure developed in the high-pressure passage downstream of the metering orifice to a second chamber of the flow control valve. An exhaust port communicates with the first chamber. A movable valve spool is disposed in a valve bore and has one end exposed to the first chamber and opposite end exposed to the second chamber. A valve spring is disposed in the second chamber together with a slide coupled with an external actuator. One end of the valve spring is seated on the opposite end of the valve spool and opposite end thereof is seated on the slide. The actuator is responsive to a control signal to position the slide thereby varying force with which the valve spring urges the valve spool. A control unit develops the control signal in response to turning maneuvers.

13 Claims, 6 Drawing Sheets

FLOW CONTROLLING APPARATUS FOR POWER STEERING SYSTEMS

BACKGROUND OF THE INVENTION

The present invention relates to a hydraulic power steering system for automotive vehicles. Specifically, the present invention relates to improvements in hydraulic fluid pumps used in power steering systems to reduce parasitic horsepower losses in the pump thereby saving energy for driving the pump.

Hydraulic power steering systems for automotive vehicles employ, as a source of hydraulic fluid, a pump driven by the vehicle engine. The horsepower required to drive the pump is proportional to the product of the rate of flow and the discharge pressure of the pump. The displacement of the pump must be great enough to supply the flow demand of the steering gear during steering maneuvers when the engine operates at low speed.

As the pump speed increases with the vehicle speed, the flow delivery increases. But since the horsepower consumption of the pump is proportional to both flow and pressure at the outlet of the pump, a feasible way to reduce the pump free-flow horsepower loss is by reducing the discharge pressure. This is in contrast to the concept employed in the prior art systems where reducing the flow by means of a flow control valve reduces horsepower loss.

U.S. Pat. No. 5,112,199, issued to Otaki et al. on May 12, 1992, discloses a pump having a flow control valve to reduce the flow when the engine operates at a high speed. With the flow control valve, the volume of hydraulic fluid far in excess of the flow requirement is returned from the working chamber of the pump to the pump inlet. A similar pump is disclosed in U.S. Pat. No. 5,098,259 issued to Ohtaki et al. on Mar. 24, 1992.

A power steering pump flow and pressure control valve disclosed in U.S. Pat. No. 4,135,436 issued to Duffy on Jan. 23, 1979 employs the concept of reducing the pump discharge pressure. According to this prior art, using a variable orifice at a location between the pump discharge and the power steering gear inlet reduces the discharge pressure of the pump. The variable orifice includes an orifice pin that is carried by a flow control valve spool. The position of the pin may be changed relative to the spool in response to changes in the pressure upstream of the orifice. With this arrangement, when the pressure is increased in response to an increased torque demand, the orifice pin will become adjusted to increase the effective size of the flow control orifice thereby allowing the flow to increase to a higher level during high-pressure operation. In contrast, the pressure is reduced when the flow is reduced as the orifice pin returns to a high restriction position relative to the valve spool.

A power steering system disclosed in U.S. Pat. No. 5,471,838 issued to Suzuki et al. on Dec. 5, 1995 saves horsepower required to drive the pump. According to this known power steering system, a supply passage between the pump outlet and the steering gear inlet is provided with two orifices in series, namely, a metering orifice and a control orifice upstream of the metering orifice. A flow control valve responsive to the pressure difference across the metering orifice returns the excess volume of hydraulic fluid to the pump inlet when a predetermined rate of flow is exceeded. A bypass valve responsive to the pressure difference across the control orifice drains the pressure in a spring chamber of the flow control valve when the pressure difference across the control orifice exceeds a predetermined value. This situation occurs when the pump rotates at a speed higher than a predetermined speed value. Since the flow control valve keeps the pressure difference across the metering orifice almost constant, draining the pressure in the spring chamber reduces the pump discharge pressure thereby reducing the horsepower required to drive the pump. During a steering maneuver, a bypass flow control valve recovers the flow to the steering gear inlet. Turning the steering wheel increases load pressure acting on the steering gear inlet. In response to the increased load pressure, the bypass control valve restricts draining of the pressure in the spring chamber.

U.S. Pat. No. 5,474,145 issued to Haga et al. on Dec. 12, 1995 corresponds to JP-A 7-81593 and discloses a hydraulic power steering system including a pump, a flow control valve and a bypass control valve. A metering orifice is disposed in a supply passage between the pump outlet and the steering gear inlet. The flow control valve responsive to the pressure difference or pressure drop across the metering orifice returns the excess volume of hydraulic fluid to the pump inlet. A spring chamber of the flow control valve is connected to the supply passage at a portion downstream of the metering orifice through a feedback passage provided with a control orifice. The bypass control valve is fluidly disposed between the spring chamber and the fluid reservoir and controls the pressure in the spring chamber. The bypass control valve has a spool, a load pressure admission port and a pilot port. The load pressure admission port is connected to the feedback passage at a portion upstream of the control orifice or the supply passage at a portion between the metering orifice and the steering gear inlet. The pilot port is connected to the feedback passage at a portion downstream of the control orifice. The spool has at one end an enlarged diameter pressure acting area exposed to the load pressure at the load pressure admission port. At the opposite end, the spool has a reduced diameter pressure acting area exposed to the pilot pressure at the pilot port. The bypass control valve has a spring biasing the spool toward the load pressure admission port.

The load pressure increases during steering maneuvers by the operator. When the load pressure increases, the bypass control valve shuts off draining of the pressure in the spring chamber thereby causing the pressure in the spring chamber to increase. In response to the increased pressure in the spring chamber, the control valve closes the bypass passage thereby reducing flow of hydraulic fluid from the supply passage at a portion upstream of the metering orifice to the pump inlet to zero. This increases the flow through the supply passage to the steering gear input.

U.S. Pat. No. 5,577,573 issued to Haga et al. on Nov. 26, 1996 shows the control valve and bypass control valve as an integral part of the pump. To supply less flow requirement the higher the vehicle speed is, a variable orifice is arranged in the place of a fixed orifice as the metering orifice. As the vehicle speed increases, a solenoid-operated rod gradually closes the variable orifice thereby to gradually restrict flow to the steering gear inlet.

According to the known system using the load pressure responsive bypass control valve, if a minimum flow to the steering gear inlet is low, it takes a considerable time until development of the load pressure high enough to activate the bypass control valve upon rapid turning maneuver. This results from consumption of volume of hydraulic fluid by the power cylinder. This delay leads to an undesired slow build-up of power-assist. Thus, the minimum flow is adjusted to a level high enough to minimize the above-mentioned delay. In other words, the minimum flow cannot be adjusted below this level which is high.

According to this known system, when the steering wheel is at rest or in neutral state, the bypass control valve allows flow through the pilot port toward the drainage. Under this condition, hydraulic fluid discharged from the pump must pass through the metering orifice and then the control orifice before reaching the pilot port.

For the previously mentioned reasons, discharge pressure of the pump cannot be lowered to a satisfactorily low level when the steering wheel is in neutral state.

SUMMARY OF THE INVENTION

The present invention aims at reducing discharge pressure of the engine driven pump to a satisfactorily low level when the steering wheel is in neutral state with normal function of the power steering system unaltered thereby reducing horsepower required to drive the pump for energy saving.

An object of the present invention is to provide a flow controlling apparatus which does not use the bypass control valve for urging the flow control valve to shift between different operation states thereby avoiding the above-mentioned insufficiencies caused by the bypass control valve.

The present invention provides a flow controlling apparatus that does not use a bypass control valve which is operable in response to load pressure which develops in a pressure delivery passage at a section between a metering orifice and the steering gear inlet.

Specifically, the flow controlling apparatus according to the present invention uses an actuator to vary spring force with which a valve spool of a flow control valve is urged. Under normal conditions, the actuator minimizes the spring force to allow the spool to open unrestricted flow communication between a delivery port upstream of the metering orifice and an exhaust or drain port thereby reducing horsepower required to drive the pump. Upon or immediately after initiation of turning maneuvers, the actuator increases the spring force, causing an increase in discharge pressure of the pump to ensure a flow high enough to comply with high flow requirements.

According one aspect of the present invention, there is provided a flow controlling apparatus for a power steering system, comprising:

a valve housing having formed therein a valve bore;

a movable valve spool disposed in said valve bore, said valve spool defining within said valve bore a first chamber and a second chamber, said valve spool having one end portion exposed to said first chamber and opposite end portion exposed to said second chamber;

a high-pressure port communicating with said first chamber;

an exhaust port communicating with said valve bore adjacent said one end portion of said valve spool;

a delivery port;

a first orifice disposed between said delivery port and said first chamber to establish flow communication therebetween;

a feedback passage distributing feedback pressure to said second chamber;

a spring disposed in said second chamber and having one end seated on said valve spool:

a slide received in said second chamber and engaging opposite end of said spring; and an actuator coupled with said slide for positioning said slide thereby varying spring force with which said spring urges said valve spool toward said first chamber.

According to another aspect of the present invention, there is provided a power steering system for an automotive vehicle, comprising:

a steering gear adapted to be connected to dirigible wheels of the automotive vehicle, said steering gear including a steering wheel;

a fluid pump;

a valve housing having formed therein a valve bore;

a movable valve spool disposed in said valve bore, said valve spool defining within said valve bore a first chamber and a second chamber, said valve spool having one end portion exposed to said first chamber and opposite end portion exposed to said second chamber;

a high-pressure port communicating with said first chamber;

an exhaust port communicating with said valve bore adjacent said one end portion of said valve spool;

a delivery port connected to said steering gear;

a first orifice disposed between said delivery port and said first chamber to establish flow communication therebetween;

a feedback passage distributing feedback pressure to said second chamber;

a spring disposed in said second chamber and having one end seated on said valve spool:

a slide received in said second chamber and engaging opposite end of said spring;

an actuator coupled with said slide for positioning said slide in response to a control signal, thereby varying spring force with which said spring urges said valve spool toward said first chamber; and a control unit developing said control signal in response to turning maneuvers of said steering wheel.

DETAILED DESCRIPTION OF THE INVENTION

Figure 1:
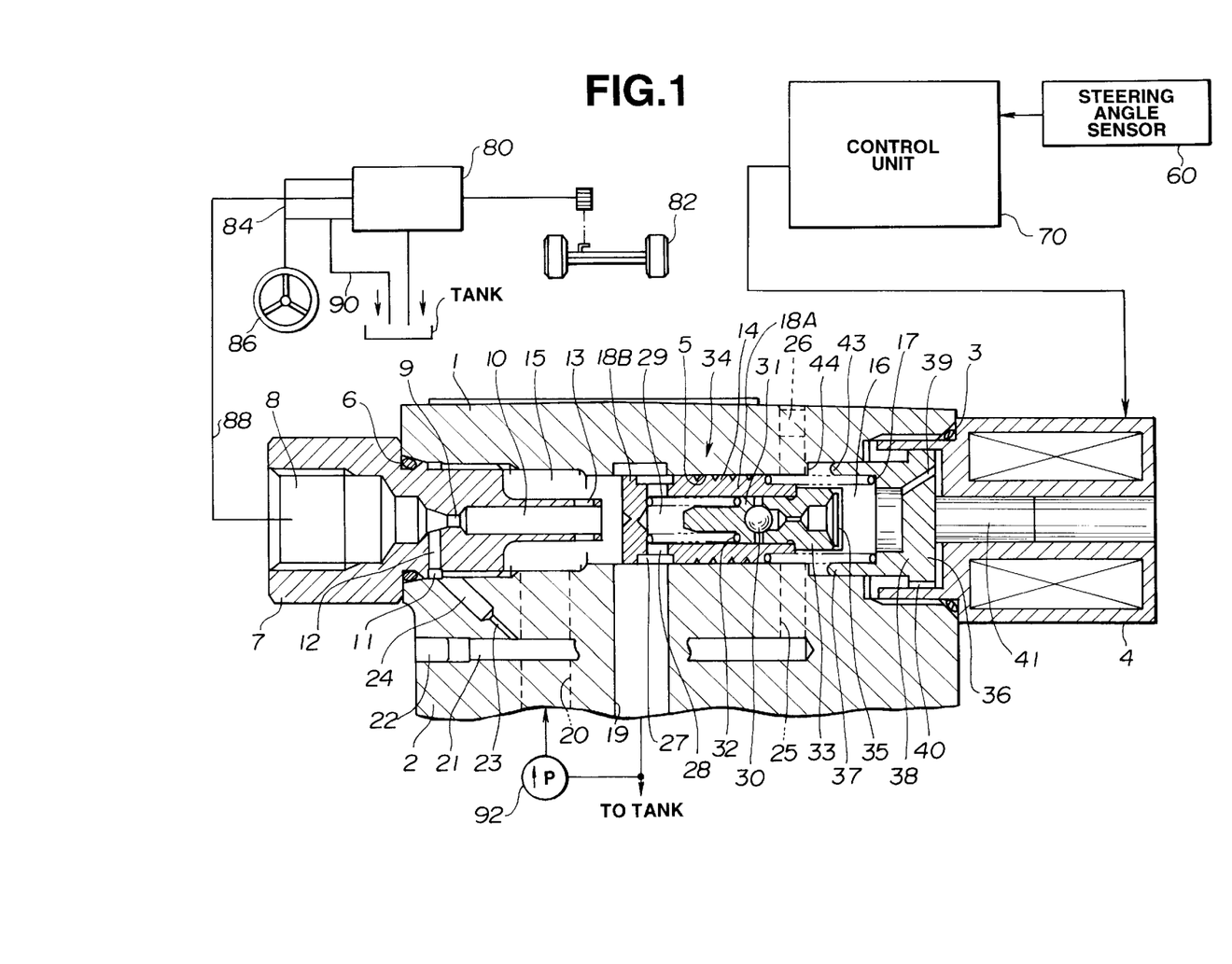
FIG. 1 shows a cross-sectional view of a flow control valve for a power steering system in an automotive vehicle. The system elements apart from the valve are shown in schematic form.

In FIG. 1, reference numeral 80 designates a power steering gear for an automotive vehicle. The gear 80 includes a fluid motor that is connected to the dirigible wheels 82 of the vehicle. During turning maneuvers of the vehicle, the flow requirements of the steering gear are increased. During straight-ahead driving, the flow requirements of the steering gear 80 are at a minimum value.

A torque sensitive control valve 84 is connected to the steering gear 80 and to a driver controlled steering wheel 86. When torque is applied to the steering wheel 86, relative displacement of the cooperating valve elements of the valve 80 takes place thereby controlling distribution of hydraulic fluid or oil under high pressure from supply passage 88 to an exhaust passage 90 communicating with a reservoir or tank.

The control valve assembly is shown at 34. It includes a valve housing 1 formed as an integral part of a pump body 2 of a pump 92 that is driven by the vehicle engine. The valve housing 1 is formed with a valve bore 5. A multiple land valve spool 14 is positioned for sliding movement within the valve bore 5 and it is urged in a left-hand direction, viewing in FIG. 1, by a valve spring 17. The valve spool 14 includes two spaced valve lands 18A and 18B that register in sliding relation with the inner wall of the valve bore 5. The lands 18A and 18B are spaced by a groove 27. An exhaust port 19 communicates with the valve bore 5 at an area where the groove 27 always stays. This port 19 communicates with the inlet side of the pump 92 or the tank. A high pressure port 20, which communicates the outlet side of the pump 92, communicates also with the valve bore 5 at an area on the left-hand side, viewing in FIG. 1, of the valve land 18B. The valve spool 14 always uncovers this area. A cylindrical orifice element 7 is received in the left-hand end of the valve bore 5 and is held in place by external threads.

An O-ring 6 surrounds the orifice element 7 and the enlarged diameter portion of the orifice element 7 defines a stop that engages the adjacent wall of the valve housing 1. An orifice element extension 13 defines a passage 10 therein. The end of the orifice element extension 13 is spaced from the valve land 18B. The outer wall of the orifice element extension 13 is spaced from the adjacent wall of the valve bore 5. The orifice element 7, the extension 13 and the valve spool 5 cooperate with each other to define in the valve bore 5 a first chamber 15. The passage 10 communicates with the first chamber 15, which in turn communicates with the high-pressure port 20. The valve land 18B establishes controlled communication between the high-pressure port 20 and the exhaust port 19.

The orifice element 7 has formed therein a delivery port 8 and a metering orifice 9 which supplies fluid to the delivery passage 88 for the torque sensitive valve 84, which in turn controls distribution of pressure to the steering gear 80. The delivery port 8 communicates with the delivery passage 88. The metering orifice 9 is disposed between the delivery port 8 and the passage 10 of the extension 13.

The valve spool 14 is hollow and it receives a pressure relief ball element 30 that is held against a valve seat 33 by a valve spring 32. One end of the valve spring 32 is seated on the closed end wall of a blind bore 29. The opposite end of the valve spring 32 is seated on a spring retainer 32 that is positioned in the blind bore 29 for sliding movement. The valve seat 33, which is in the form of a plug, is received in the open end of the blind bore 29 and held in place by external threads. The valve seat 33 has formed therein a passage provided with a filter 35. An O-ring surrounds the valve seat 33 and the valve seat 33 engages the adjacent end wall of the valve spool 14.

The valve spool 14 has formed therein radial ports 28 which establish flow communication between the blind ended bore 29 and the exhaust port 19 via the groove 27. Although not illustrated, the spring retainer 31 has formed therein passage means for establishing flow communication between the passage of the valve seat 33 and the radial ports 28 when the ball element 30 disengages from the valve seat 33.

An actuator 4, which is in the form of a solenoid operable actuator, is received in the right-hand, viewing in FIG. 1, end of the valve bore 5 and held in place by external threads. An O-ring 3 surrounds the actuator 4 and the actuator 4 engages the adjacent wall of the valve housing 1.

The actuator 4 and the valve spool 14 cooperate with each other to define in the valve bore 5 a second or spring chamber 16. A slide 36 has fixed thereto a core 41 of the actuator 4 and it is received in the second chamber 16 for sliding movement. The slide 36 includes a disc 38 and a cylindrical extension 37, which serves as a spring retainer. One end of the valve spring 17 is seated on the wall of the land 18A and the opposite end thereof is seated on the inner wall of the cylindrical extension 37. The disc 38 has formed therein at least one peripheral axial groove 40 and at least one through passage 39 which communicates with the interior of the cylindrical extension 37. The slide 36 can move from the illustrated position where it engages the adjacent wall of the actuator 4 until an end wall 43 of the cylindrical extension 37 engages a stop 44 on the valve housing 1.

Feedback pressure is distributed to the right-hand side of the valve spool 14 through a feedback passage which is provided with a damper in the form of a flow restriction, namely a control orifice 23. The feedback passage includes a radial bore 12 drilled inwardly of the orifice element 7 from a groove 11 to the delivery port 8. This groove 11 communicates with an inclined bore 24 formed in the valve housing 1. The inclined bore 24 communicates via the orifice 23 with a bore 21 which extends through the pump body 2 in parallel relation to the valve bore 5. Open end of the bore 21 is closed by a plug 22. A bore 25 is drilled inwardly from the valve housing 1 into the pump body 2 and it crosses the valve bore 5. This bore 25 communicates with the second chamber 16 of the valve bore 5 and also with the bore 21. The open end of the bore 25 is closed by an end plug 26.

Reference numeral 70 designates a control unit for the actuator 4. The control unit 70 inputs information from turning maneuvers based on a sensor signal of a steering angle sensor 60 and develops an output The control unit 70 includes as usual a central processor unit (VPU), a read only memory (ROM), a random access memory (RAM) and an input and output interface (I/O). The steering angle sensor may be in the form of a sensor as disclosed in U.S. Pat. No. 4,342,279 issued to Seko et al. on Aug. 3, 1982 or U.S. Pat. No. 5,353,004 issued to Takemoto et al. on Oct. 4, 1994.

The design approach according to the first embodiment assumes that in a vehicle steering system the requirement for high flow will occur as the operator maneuvers the steering gear 80 by turning the steering wheel 86 and that the minimum flow is required under the other conditions. According to this embodiment, during normal operation, the solenoid of the actuator 4 is not energized thereby causing the valve spring 17 to urge the valve spool 14 with a minimum spring force. When the operator maneuvers the steering gear 80 by turning the steering wheel 86, the solenoid of the actuator 4 is energized thereby moving the slide 36 to the left, viewing in FIG. 1, until the end 43 of the cylindrical extension 37 engages the stop. 44 This causes the valve spring 17 to urge the valve spool 14 with a maximum spring force. With the minimum spring force by the valve spring 17, the land 18B of the valve spool 14 regulates flow communication between the delivery port 20 of the pump 92 and the exhaust port 19 to adjust flow through the delivery passage 88 to the minim flow value Qmin. With the maximum spring force, the land 18B of the valve spool 14 regulates the flow communication between the delivery port 20 of the pump 92 and the exhaust port 19 to adjust flow through the delivery passage 88 to the maximum flow value Qmax.

Figure 2:
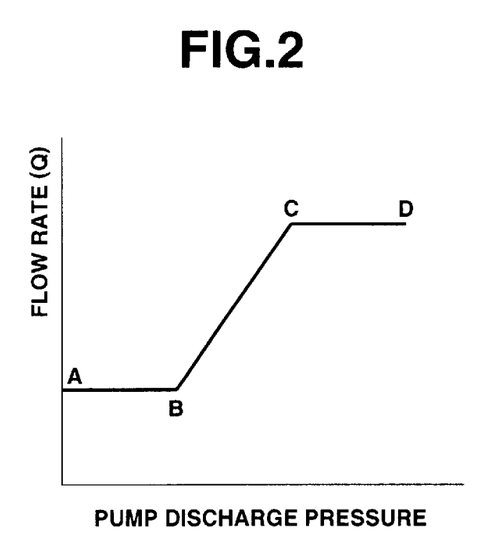
FIG. 2 shows a relationship between pump discharge pressure and rate of flow delivered by the pump.

FIG. 2 shows the schematic illustration of the pump flow of a power steering pump. At low pressure between A and B, the minimum flow value Qmin is achieved. At high pressure between C and D, the maximum flow value Qmax is achieved.

Figure 3:
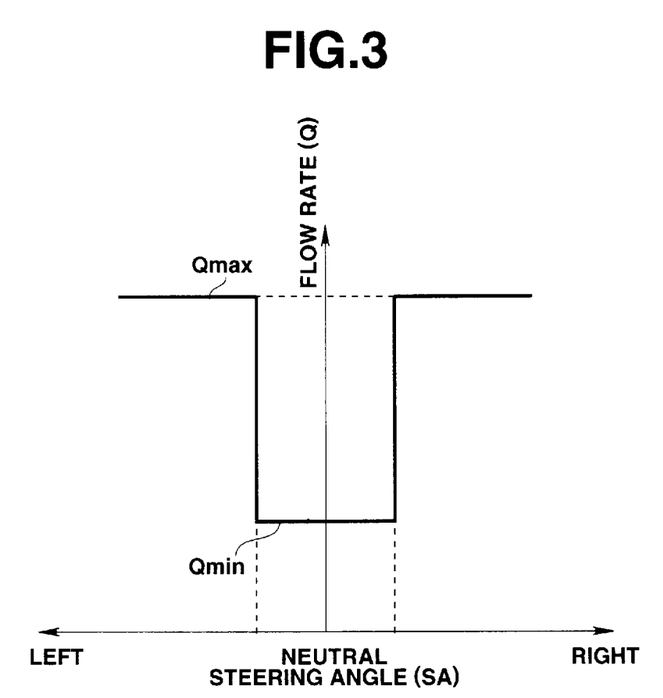
FIG. 3 shows a relationship between angles through which the steering wheel is turned and desired pump flow rates during turning maneuvers.

FIG. 3 shows a control strategy employed in the first embodiment. There is a window around the neutral or rest position of the steering wheel. When the steering angle SA falls in the window, the minimum flow value Qmin is set as a desired flow Q and electric current EC for the solenoid of the actuator 4 is set in a manner predetermined as a function of Q=Qmin. In this embodiment, EC is zero under this condition and thus the solenoid of the actuator 4 is not energized. When the operator turns the steering wheel 86 beyond the window to maneuver the steering gear 80, the maximum flow value Qmax is set as the desired flow Q and electric current EC for Q=Qmax is set. In this embodiment, the solenoid of the actuator 4 is energized.

Figure 4:
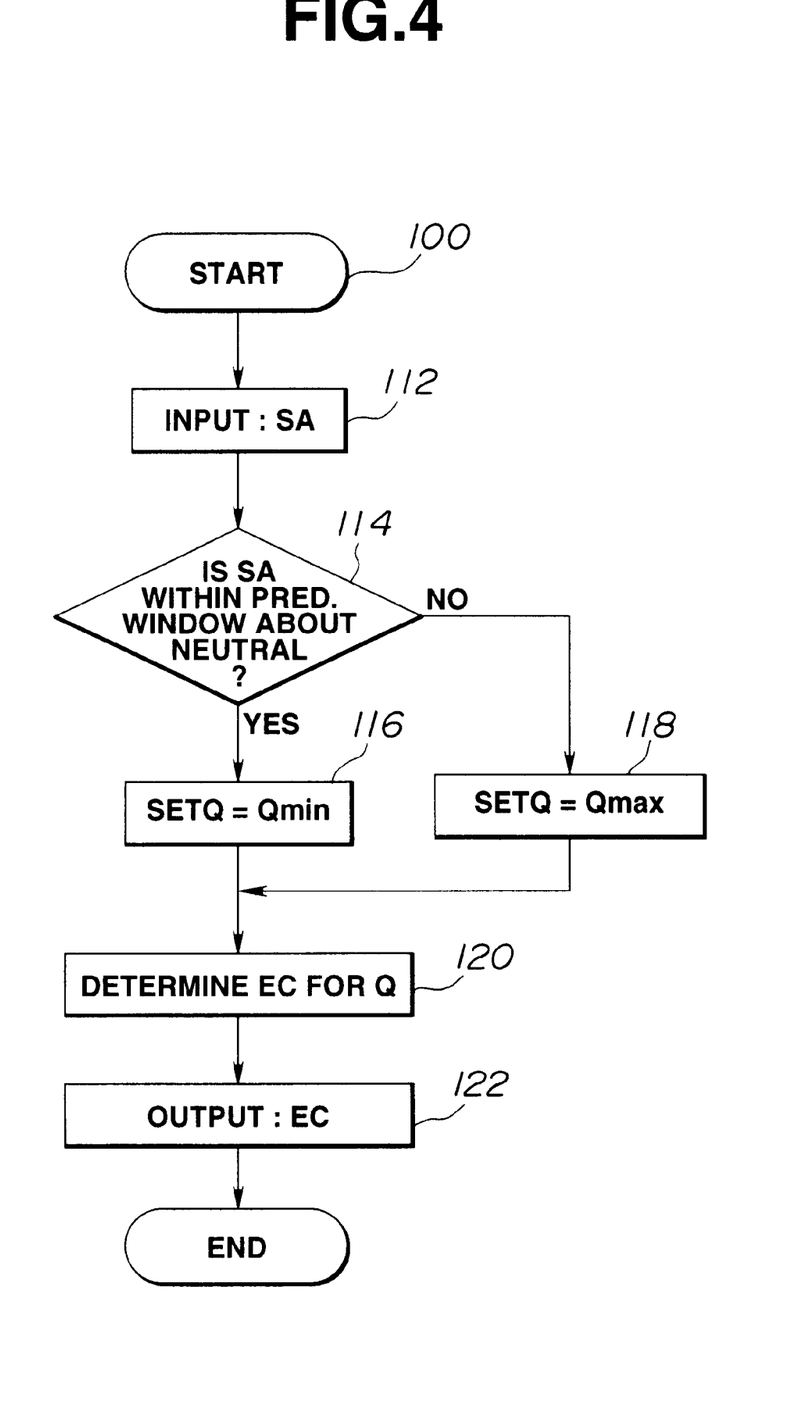
FIG. 4 is a flow chart of a preferred implementation of a control strategy shown in FIG. 3.

FIG. 4 is a flow chart illustrating the preferred implementation of the present invention. In FIG. 4, at a step 112, the control unit 70 inputs the steering angle SA information received from the sensor signal produced by the steering angle sensor 60. In interrogation step 114, the control unit 70 determines whether or not the steering angle SA falls in the window around the neutral position. If this is the case, the control unit 70 sets, at step 116, the minimum flow value Qmin as the desired flow Q. If the result of the interrogation is negative, the control unit 70 sets, at step 118, the maximum flow value Qmax as the desired flow Q. After the step 116 or 118, the control routine proceeds to step 120. At step 120, the control unit 70 determines electric current EC in a manner determined as a function of the desired flow Q. In this example, if Q=Qmin, EC is zero, while, if Q=Qmax, EC is electric current value high enough to energize the solenoid of the actuator 4. At step 122, the control unit 70 outputs the determined EC to a driver circuit of the actuator 4 before returning to a start point 100.

In the first embodiment, the actuator 4 is one of the ON-OFF types. Thus, the calibrated flow Q when the steering angle SA is outside of the window is uniform.

Figure 5:
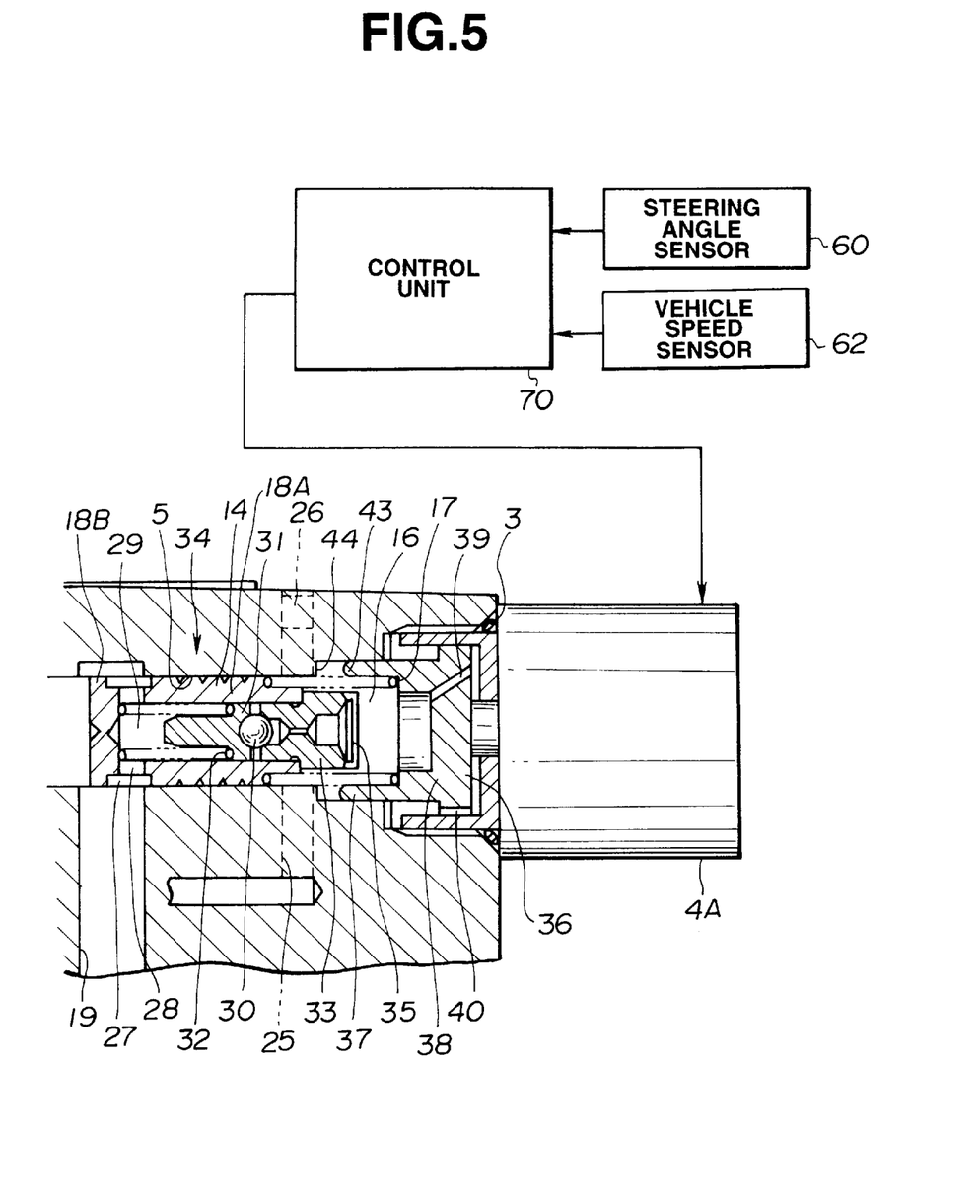
FIG. 5 shows a fragmentary view of a second embodiment.
Figure 6:
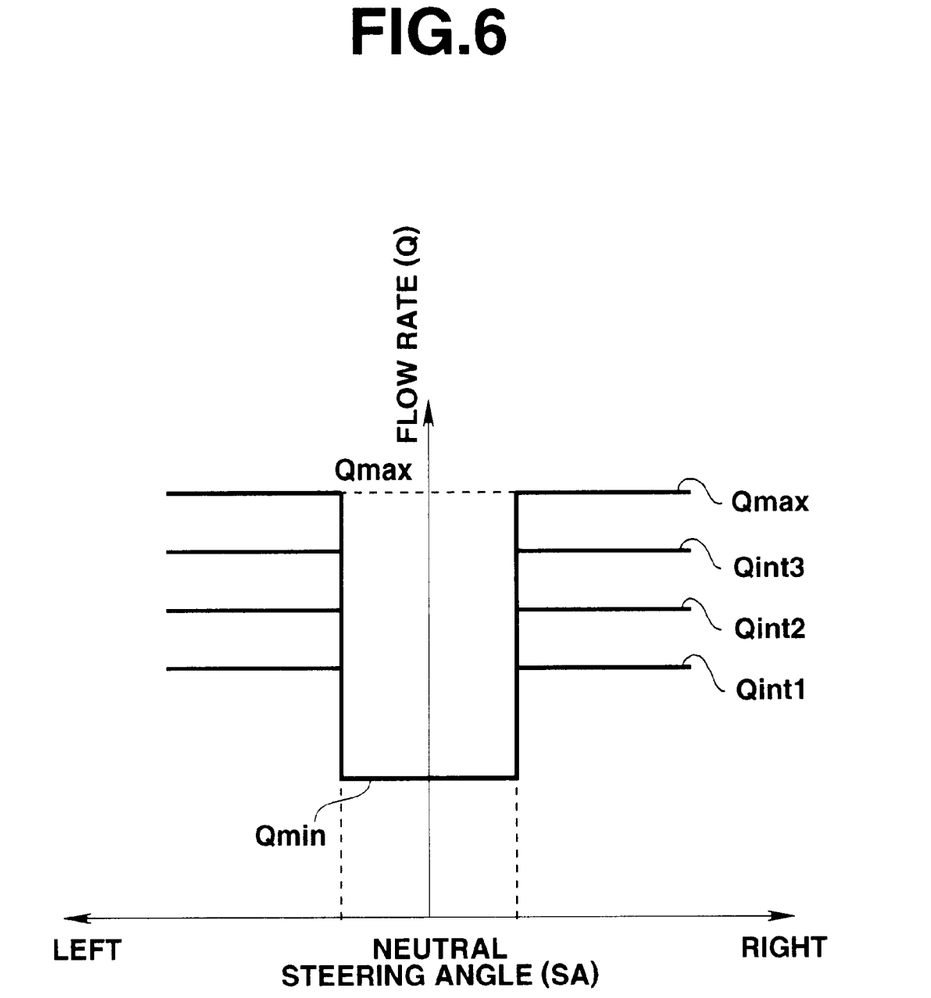
FIG. 6 shows a modified relationship between angles through which the steering wheel is turned and desired pump flow rates during turning maneuvers.
Figure 7:
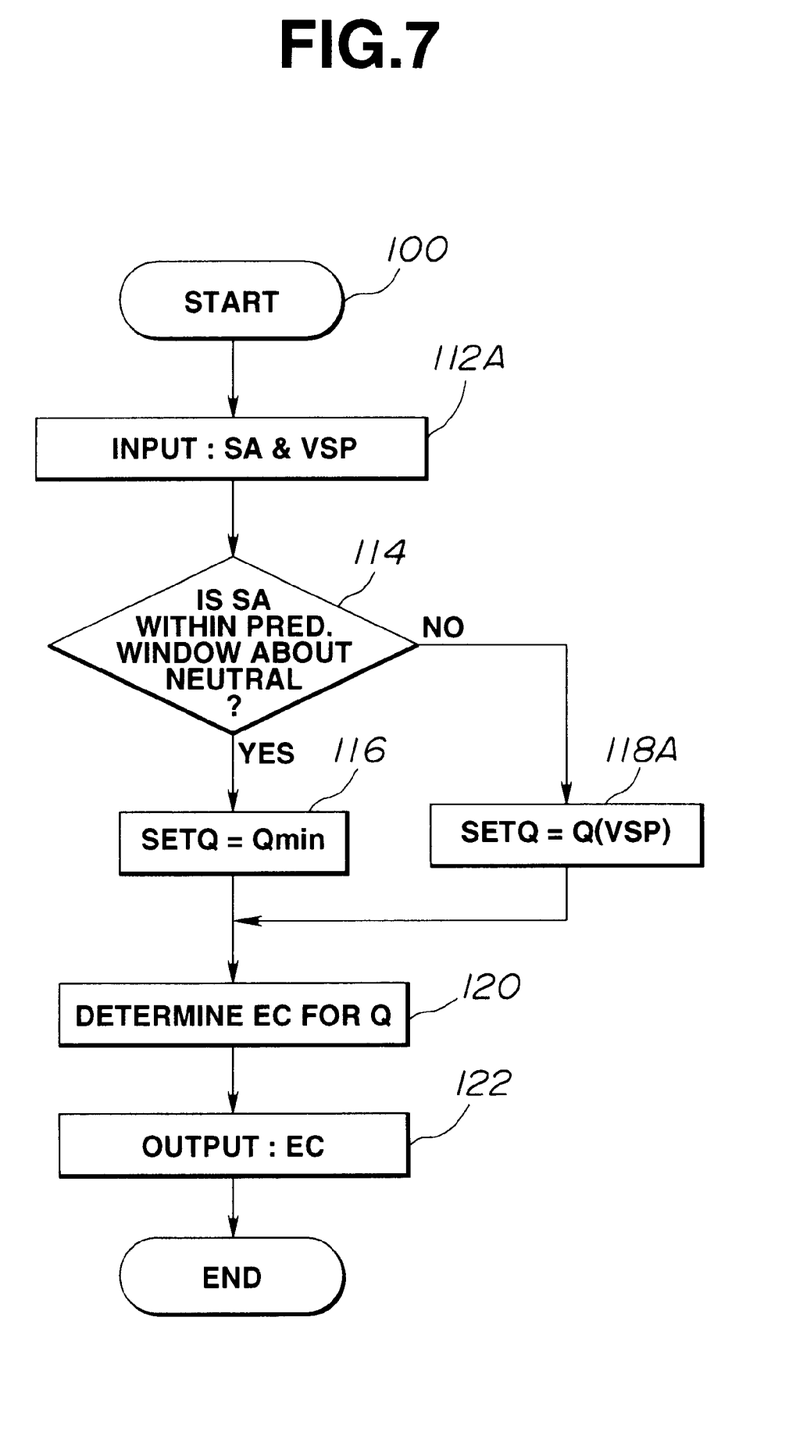
FIG. 7 is a flow chart of a preferred implementation of a control strategy shown in FIG. 6.

FIGS. 5 to 7 show the second embodiment. According to this second embodiment, when the steering angle SA is outside of the window, the desired flow Q is determined as a function of vehicle speed VSP. FIG. 5 shows a fragmentary cross-sectional view of a flow control valve. This flow control valve is substantially the same as its counterpart of the first embodiment except for the use of a proportional type solenoid operated actuator 4A instead of the ON-OFF type solenoid operated actuator 4 and the provision of a vehicle speed sensor 62. With the proportional type actuator 4A, a slide 36 can take various intermediate positions between the illustrated position and the limit position where the end 43 of a cylindrical extension 37 engages a stop 44. This means that the spring force applied to a valve spool 14 by a valve spring 17 can take various intermediate values between the minimum and maximum values.

FIG. 6 is a similar view to FIG. 2 and shows a control strategy employed in the second embodiment. There is a window around the neutral or rest position of the steering wheel. When the steering angle SA falls in the window, the minimum flow value Qmin is set as a desired flow Q and the electric current EC for the solenoid of the actuator 4A is set in a manner predetermined as a function of Q=Qmin. In this embodiment, EC is zero under this condition and thus the solenoid of the actuator 4A is not energized. When the operator turns the steering wheel beyond the window to maneuver the steering gear, the desired flow Q is determined as a function of vehicle speed VSP. For example, when the vehicle speed VSP is low, the maximum flow value Qmin is set as the desired flow Q. When the vehicle speed VSP is high, a flow value Qint1 is set as the desired flow Q. This value Qint1 is lower than the maximum flow value Qmax but higher than the minimum flow value Qmin. When the vehicle speed VSP is an intermediate vehicle speed value higher than a reference value, a flow value Qint2 is set as the desired flow Q. When the vehicle speed VSP is an intermediate vehicle speed lower than the reference value, a flow value Qint3 is set as the desired flow Q. The flow value Qint2 is higher than the flow value Qint1 but lower than the flow value Qint3 that is lower than the maximum flow value Qmax.

FIG. 7 is a flow chart similar to its counterpart in FIG. 4 and illustrates the preferred implementation of the present invention. In FIG. 7, at a step 112A, a control unit 70 inputs steering angle SA information received from a sensor signal produced by the steering angle sensor 60 and vehicle speed VSP information received from a sensor signal of the vehicle speed sensor 62. In the interrogation step 114, the control unit 70 determines whether or not the steering angle SA falls in the window around the neutral position. If this is the case, the control unit 70 sets, at step 116, the minimum flow value Qmin as the desired flow Q. If the result of the interrogation is negative, the control unit 70 determines, at step 118A, the desired flow Q as a function of the vehicle speed VSP by performing a look-up operation of FIG. 6. After the step 116 or 118A, the control routine proceeds to step 120. At step 120, the control unit 70 determines electric the current EC in a manner determined as a function of the desired flow Q. At step 122, the control unit 70 outputs the determined EC to a driver circuit of the actuator 4A before returning to a start point 100.

From the preceding description, it will be understood that there occurs an increase of flow requirement during rapid turning maneuvers. In this case, the valve land 18B closes the exhaust port 19 immediately after the steering angle SA has exceeded one of the limits defining the window thereby supplying increased the flow requirement without any delay. This means that the minimum flow may be reduced to a satisfactorily low level. This in turn reduces the horsepower required to drive the pump.

In the previously described embodiments, the control unit relies on the steering angle to determine whether or not there are high flow requirements. Minimum flow is calibrated when there are no high flow requirements, while higher or maximum flow is calibrated when there are high flow requirements.

If desired, the control unit may rely on at least one of steering angle, speed at which operator turns steering wheel, torque with which operator turns steering wheel, state of a steering wheel neutral position detecting switch, and a gear position established in the vehicle transmission.

What is claimed is:

1. A flow controlling apparatus for a power steering system, comprising:

a valve housing;

a valve bore formed in said valve housing;

a movable valve spool disposed in said valve bore and defining within said valve bore a first chamber and a second chamber, wherein said valve spool has one end portion exposed to said first chamber and an opposite end portion exposed to said second chamber;

a high-pressure port communicating with said first chamber;

an exhaust port communicating with said valve bore adjacent said one end portion of said valve spool;

a delivery port;

a first orifice disposed between said delivery port and said first chamber to establish flow communication therebetween;

a feedback passage distributing feedback pressure to said second chamber;

a spring disposed in said second chamber and having one end seated on said valve spool;

a slide received in said second chamber and engaging an opposite end of said spring;

an actuator coupled with said slide for positioning said slide, thereby varying a spring force with which said spring urges said valve spool toward said first chamber; and a control unit which determines information of turning maneuvers, develops a control signal in response to said determined information of turning maneuvers, and applies said control signal to said actuator thereby causing said actuator to position said slide.

2. A flow controlling apparatus as claimed in claim 1, wherein said actuator is a solenoid-operated actuator of the ON-OFF types.

3. A flow controlling apparatus as claimed in claim 2, wherein said control unit inputs information of steering angle.

4. A flow controlling apparatus as claimed in claim 2, wherein said control unit inputs information of at least one of steering angle, speed at which operator turns steering wheel, torque with which operator turns steering wheel, state of a steering wheel neutral position detecting switch, and a gear position established in a transmission.

5. A flow controlling apparatus, comprising:

a valve housing;

a valve bore formed in said valve housing;

a movable valve spool disposed in said valve bore and defining within said valve bore a first chamber and a second chamber, wherein said valve spool has one end portion exposed to said first chamber and an opposite end portion exposed to said second chamber;

a high-pressure port communicating with said first chamber;

an exhaust port communicating with said valve bore adjacent said one end portion of said valve spool;

a first orifice disposed between said delivery port and said first chamber to establish flow communication therebetween;

a feedback passage distributing feedback pressure to said second chamber;

a spring disposed in said second chamber and having one end seated on said valve spool;

a slide received in said second chamber and engaging an opposite end of said spring;

an actuator coupled with said slide for positioning said slide, thereby varying a spring force with which said spring urges said valve spool toward said first chamber; and a control unit which determines information of turning maneuvers and vehicle speed, develops a control signal in response to said determined information of turning maneuvers and vehicle speed, and applies said control signal to said actuator thereby causing said actuator to position said slide.

6. A flow controlling apparatus as claimed in claim 5, wherein said actuator is a solenoid-operated actuator of the proportional types.

7. A flow controlling apparatus as claimed in claim 6, wherein said control unit inputs information of steering angle and vehicle speed.

8. A flow controlling apparatus as claimed in claim 6, wherein said control unit inputs information of at least one of steering angle, speed at which operator turns steering wheel, torque with which operator turns steering wheel, state of a steering wheel neutral position detecting switch, and a gear position established in a transmission.

9. A power steering system for an automotive vehicle, comprising:

a steering gear adapted to be connected to dirigible wheels of the automotive vehicle, said steering gear including a steering wheel;

a fluid pump;

a valve housing;

a valve bore formed in said valve housing;

a movable valve spool disposed in said valve bore and defining within said valve bore a first chamber and a second chamber, wherein said valve spool has one end portion exposed to said first chamber and an opposite end portion exposed to said second chamber;

a high-pressure port communicating with said first chamber;

an exhaust port communicating with said valve bore adjacent said one end portion of said valve spool;

a first orifice disposed between said delivery port and said first chamber to establish flow communication therebetween;

a feedback passage distributing feedback pressure to said second chamber;

a spring disposed in said second chamber and having one end seated on said valve spool;

a slide received in said second chamber and engaging an opposite end of said spring;

an actuator coupled with said slide for positioning said slide in response to a control signal, thereby varying a spring force with which said spring urges said valve spool toward said first chamber; and a control unit developing said control signal in response to turning maneuvers of said steering wheel.

10. A power steering system as claimed in claim 9, wherein said control unit determines whether or not there are flow requirements for power-assist;

said control unit develops said control signal to instruct a higher flow than a minimum flow when said control unit determines there are flow requirements for power-assist;

said control unit develops said control signal to instruct the minimum flow when said control unit determines there are no flow requirements for power-assist; and said control unit applies said control signal to said actuator.

11. A power steering system as claimed in claim 10, wherein said actuator positions said slide to cause said spring to urge said valve spool with a minimum spring force when said control signal instructs the minimum flow.

12. A power steering system as claimed in claim 11, wherein said control unit inputs information of steering angle;

said control unit determines whether or not there are flow requirements for power-assist in response to said input information of steering angle.

13. A power steering system as claimed in claim 11, wherein said control unit inputs information of at least one of steering angle, speed at which operator turns steering wheel, torque for power-assist with which operator turns steering wheel, state of a steering wheel neutral position detecting switch, and a gear position established in a transmission of the automotive vehicle; and said control unit determines whether or not there are flow requirements for power-assist in response to said input information.

* * * * *